QUICK-ACTING SQUELCH CIRCUIT

Filed March 24, 1958

INVENTORS
WESLEY M. FOLLENSBEE
EDGAR O. SCHOENIKE
BY Moody and Goldman
ATTORNEYS United States Patent Office 2,888,527
Patented May 26, 1959

2,888,527

QUICK-ACTING SQUELCH CIRCUIT

Wesley M. Follensbee, Marion, and Edgar O. Schoenike, Cedar Rapids, Iowa, assignors to Collins Radio Company, Cedar Rapids, Iowa, a corporation of Iowa Application March 24, 1958, Serial No. 723,342

3 Claims. (Cl. 179—171)

This invention relates to electronic squelch circuits not requiring relays.

Prior squelch circuits, which solely rely on electron-control devices for opening and closing an audio output circuit in response to received signal level, have the difficulty that they do not operate solely as "off" and "on" switches. That is, during a "low range" of received signal level just above the squelch level, conventional circuits permit their audio output to vary between "off" and "on" conditions. During this low signal range, the audio output is attenuated, which is very undesirable since it occurs at the very time when maximum receiver sensitivity is essential, in that maximum intelligibility requires sufficient sound volume. Thus, there is no squelch action by conventional circuits during this low signal range; and yet, very often an unintelligible sound is permitted to be heard, which could be made intelligible.

The prior relay type of squelch circuit avoided the intermediate range condition, since the relay was either open or closed. However, relays are generally slow-acting and part of the output is lost due to the actuation-time of the relay. Also, relays consume large amounts of power, have substantial size, and are costly.

It is therefore an object of this invention to provide an electronic squelch circuit which is capable of very fast action in a bistable manner which eliminates the undesirable ineffective low range.

The invention includes a pair of electron-control devices with the grid of the first receiving a conventional squelch-control voltage. Resistors are connected serially to both the cathode and the plate of the first amplifier. The second electron-control device is a switched audio amplifier, and it has its grid connected to the plate of the first tube and also has the audio signal connected to a grid. A voltage divider comprising the cathode resistance of the first tube, a Zener diode, and a plurality of resistors are connected between ground and a source voltage. The cathode of the audio amplifier is connected to an intermediate point among the plurality of resistors of the divider. Another diode of ordinary type is connected between the Zener diode and the plate of the first tube. Also, the cathode of the audio amplifier is coupled to ground at audio frequencies through a capacitor. A plate load is provided for the audio amplifier, and the audio output signal is obtained from its plate.

Further objects, features and advantages of the invention will be apparent to a person skilled in the art upon further study of the specification and the accompanying drawings, in which.

Figure 1:
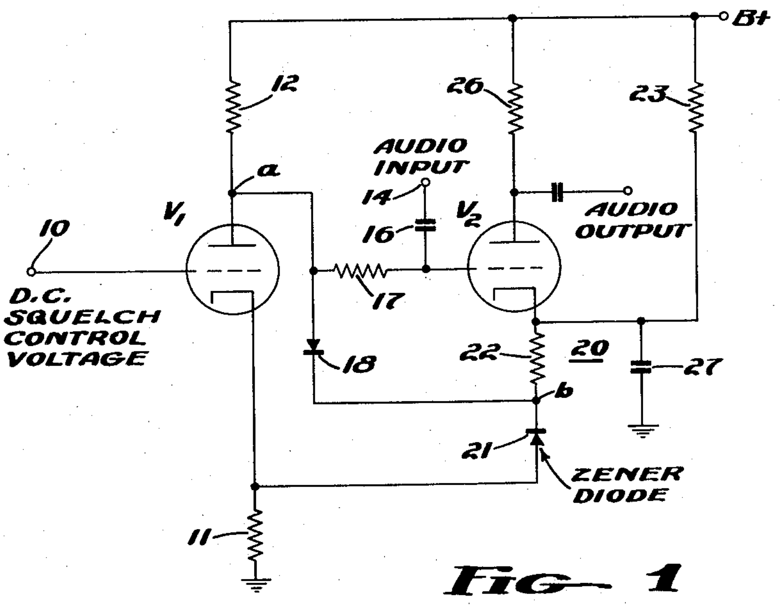
Figure 1 represents a form of the invention.

Now referring to the drawings for a detailed description of a specific form of the invention, Figure 1 shows a pair of triodes $V_1$ and $V_2$. Terminal 10 receives a direct-current squelch control voltage which is derived by conventional means in a radio receiver. Thus, the control voltage will generally vary with the A.V.C. voltage of the receiver. The control grid of tube $V_1$ is connected to terminal 10.

A pair of resistors 11 and 12 are serially connected to the cathode and plate of tube $V_1$ between ground and a direct-current B plus voltage source.

The second tube $V_2$ acts as an audio amplifier and as a switch for the audio signal. The audio input is provided at a terminal 14 which, for example, receives the signal from the detector of a radio receiver. A capacitor 16 couples terminal 14 to the grid of triode $V_2$. Furthermore, the grid of $V_2$ is connected to the plate of tube $V_1$ through a resistor 17.

A voltage divider 20 is provided between ground and the B plus source. It includes the cathode resistor 11, a Zener diode 21 and a pair of resistors 22 and 23. The cathode of tube $V_2$ is connected between resistors 22 and 23. A plate load resistor 26 connects the plate of tube $V_2$ to the B plus source. A capacitor 27 is connected between ground and the cathode of tube $V_2$. Capacitor 27 in effect connects the $V_2$ cathode to ground over the audio-frequency range, so that the audio gain of tube $V_2$ is not affected by cathode-resistance direct-current degeneration or regeneration before squelching occurs.

Another diode 18, which need not be a Zener diode, has its anode connected to the plate of tube $V_1$ and its cathode connected to the cathode of Zener diode 21. Diode 18 acts as a switch, while the Zener diode acts to maintain a constant voltage drop across itself.

Figure 2:
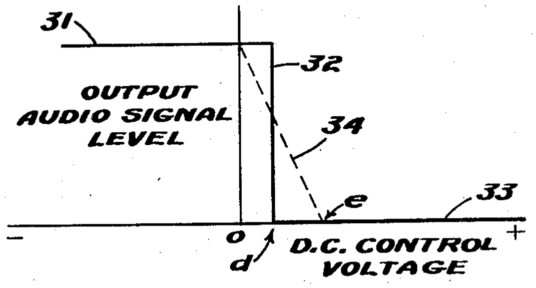
Figure 2 is a diagram used in explaining the operation of the invention.

In Figure 2, the solid-line portions 31, 32, and 33 illustrate the operation of the invention. It is noted that the audio output level remains either constant at the level of line 31 or zero represented by line 33. Hence, a switching action occurs when the control voltage reaches value *d*, which causes a sudden switching between levels 31 and 33.

Dotted line 34 illustrates the situation with many prior electronic squelch circuits, wherein the audio output level does not change abruptly between levels 31 and 33 but varies between those levels along line 34 over a control voltage range, *o* to *e*, which occurs for very low signal levels just above the squelch point, *e*. Hence, line 34 illustrates an undesirable condition, since a signal range exists in which the squelch is not fully open or closed, which reduces receiver sensitivity at the very time that it is most needed, since as long as the signal is audible, it should be capable of retaining the loudness required for best intelligibility. In the invention, the switching or squelch point *d* can be adjusted where desired.

In more detail, the operation of Figure 1 can be explained with the use of Figure 2, as the control voltage varies from a very negative value (high-level received signal) to a positive value (low-level received signal).

When the control voltage is very negative, tube $V_1$ is cut off and it provides no plate-current component through resistors 11 and 12. However, there exists a current through cathode resistor 11, because it is part of voltage divider 20. Also, no plate-current flows through resistor 12, but there exists a current through it because diode 18 is biased to conduction, with the voltage at point *a* being very slightly higher than the voltage at point *b* on divider 20. The resistance of 12 is made very large compared to the forward resistance of diode 18; accordingly, the voltage at point *a* is very nearly the same as the voltage at point *b*, and in practice they may be considered equal. As a result, when tube $V_1$ is cut off, the bias on tube $V_2$ is maintained at a constant level by diode 18, regardless of signal level change, and the gain of audio amplifier $V_2$ remains constant.

As the control voltage becomes more positive, level *d* in Figure 2 is eventually reached. At this level, the control voltage exceeds the cutoff bias of tube $V_1$ and plate current begins. A regenerative action then takes place between tubes $V_1$ and $V_2$, wherein the plate current through resistor 12 causes the plate voltage at point *a* to decrease below that at point *b*, opening diode 18 and directly decreasing the grid bias of tube $V_2$. At the same time, the bias level on the cathode of $V_2$ regeneratively increases because of the increase of tube $V_1$ plate current through resistor 11. Hence, regeneration rather than degeneration occurs to the cathode bias of tube $V_2$ and it is quickly cut off. If an ordinary resistor were used instead of the Zener diode, degeneration would have occurred in it to slow down the switching cycle. Consequently, the bias on the cathode of diode $V_2$ becomes more positive at the same time that bias on its grid becomes more negative, once plate current is started through tube $V_1$. This regenerative action quickly snaps tube $V_2$ to cutoff to open the audio output circuit.

Although this invention has been described with respect to a particular embodiment thereof, it is not to be so limited as changes and modifications may be made therein which are within the full intended scope of the invention as defined by the appended claims.

We claim:

1. A quick-acting squelch circuit comprising first and second electron-control devices, each having at least one control electrode and a plate and cathode, a squelch-control-voltage source connected to the control electrode of said first electron-control device, first resistance means connected between ground level and the cathode of said first electron-control device, second resistance means connected between the plate of said first device and a B plus source, a voltage divider comprising said first resistance means, a Zener diode, and a third resistance means connected to the B plus source; with the cathode of said second electron-control device being connected to an intermediate point on said third resistance means, means connecting the grid of said second electron-control device to the plate of said first electron-control device, a second diode having its anode connected to the plate of said first device and its cathode connected to one side of said Zener diode, a by-passing capacitor connected between ground level and the cathode of said second device, and an audio source being connected to the grid of said second device, and the squelch-controlled audio output being provided from the plate of said second device.

2. A quick-acting squelch circuit comprising first and second electron tubes, each having at least one control grid and a plate and cathode, a first resistor connected between ground and the cathode of said first tube, a second resistor connected between a B plus source and the plate of said first tube; a voltage divider comprising said first resistor, a Zener diode having its anode connected to said first resistor, and a plurality of resistors connected to the cathode of said Zener diode and the B plus source; the cathode of said second tube being connected to an intermediate point of said plurality of resistors, resistance means coupling the grid of said second tube to the plate of said first tube, a second diode having its anode connected to the plate of said first tube and its cathode connected to the cathode of said Zener diode, a plate resistor connected between the B plus source and the plate of said second tube, and a by-passing capacitor connected between ground and the cathode of said second tube.

3. A quick-acting squelch circuit comprising first and second electron-control devices, each having at least first, second and third control electrodes, a squelch-control-voltage source connected to the second control electrode of said first electron-control device, first resistance means connected between ground level and the first electrode of said first electron-control device, second resistance means connected between the third electrode of said first device and a direct-current power source; a voltage divider comprising said first resistance means, a Zener diode, and a third resistance means connected to the direct-current source; with the first electrode of said second device being connected to an intermediate point on said third resistance means, means for connecting the second electrode of said second device to the third electrode of said first device, a second diode connected between the third electrode of said first device and said Zener diode, with both of said diodes having a common-connected electrode, a by-passing capacitor connected between ground level and the first electrode of said second device, and an audio source connected to the second electrode of said second device, and the squelch control audio output being provided from the third electrode of said second device.

No references cited.